United States Patent
Nemazie

(10) Patent No.: US 7,065,076 B1
(45) Date of Patent: Jun. 20, 2006

(54) MODULAR SCALABLE SWITCHING NETWORKS

(75) Inventor: Siamack Nemazie, Los Altos Hills, CA (US)

(73) Assignee: Promise Technology, Inc., Milpitas, CA (US)

( * ) Notice: Subject to any disclaimer, the term of this patent is extended or adjusted under 35 U.S.C. 154(b) by 833 days.

(21) Appl. No.: 09/648,076

(22) Filed: Aug. 25, 2000

(51) Int. Cl.
*H04Q 11/00* (2006.01)
*H04Q 3/00* (2006.01)

(52) U.S. Cl. .................... 370/388; 340/2.21

(58) Field of Classification Search ........ 370/386–388, 370/389–399, 416–418; 340/2.2, 2.21, 2.22
See application file for complete search history.

(56) References Cited

U.S. PATENT DOCUMENTS

| | | | | |
|---|---|---|---|---|
| 4,991,171 A | * | 2/1991 | Teraslinna et al. .......... 370/388 |
| 4,993,018 A | * | 2/1991 | Hajikano et al. ........... 370/392 |
| 5,038,343 A | * | 8/1991 | Lebizay et al. ............. 370/416 |
| 5,084,867 A | * | 1/1992 | Tachibana et al. .......... 370/398 |
| 5,103,220 A | * | 4/1992 | Brunle ..................... 340/2.22 |
| 5,237,565 A | * | 8/1993 | Henrion et al. ............. 370/388 |
| 5,263,121 A | * | 11/1993 | Melsa et al. ................ 370/388 |
| 5,276,425 A | * | 1/1994 | Swanson et al. ........... 370/388 |
| 5,323,386 A | * | 6/1994 | Wiher et al. ................ 370/388 |
| 5,325,090 A | * | 6/1994 | Goeldner ................... 340/2.22 |
| 5,337,308 A | * | 8/1994 | Fan ............................. 370/388 |
| 5,631,902 A | * | 5/1997 | Yoshifuji ................... 370/388 |
| 5,982,770 A | * | 11/1999 | Sekine ....................... 370/388 |
| 6,157,643 A | * | 12/2000 | Ma ............................. 370/388 |
| 6,418,142 B1 | * | 7/2002 | Wolf ........................... 370/388 |

* cited by examiner

*Primary Examiner*—Steven Nguyen
(74) *Attorney, Agent, or Firm*—Law Offices of IMAM

(57) ABSTRACT

An embodiment of the present invention is disclosed to include a three stage scalable switching network that can be built from a common module. Further disclosed are methods for building switching network $v(k, n, m)$ from a common module comprising a $(n \times k)$ input switch, a $(k' \times k')$ middle switch, and a $(k \times n)$ output switch.

1 Claim, 2 Drawing Sheets

1st stage
m (n x k) switches

2nd stage
m (k' x k') switches

3rd stage
m (n x k) switches

| 1st stage | 2nd stage | 3rd stage |
| m (n x k) switches | k (m x m) switches | m (n x k) switches |

1st stage
m (n x k) switches
2nd stage
m (k' x k') switches
3rd stage
m (n x k) switches 1st stage
m (n x k) switches
2nd stage
m (k x k) switches
3rd stage
m (n x k) switches

MODULAR SCALABLE SWITCHING NETWORKS

FIELD OF THE INVENTION

The present invention generally relates to interconnection networks, and in particular to a scalable switching fabric architecture allowing for the building of large switching networks from a common module.

BACKGROUND OF THE INVENTION

FIG. 1 shows the structure of a crossbar matrix 1 in which input lines 10 and output lines 20 are shown to be situated perpendicular to each other and are further shown to be connected at respective crosspoints. The crossbar matrix 1 is non-blocking—any input line may be connected to any output line without blocking other input-to-output connections. For a N×N square crossbar wherein the number of input lines and output lines are the same, (N representing the number of input lines and the number of output lines) the complexity grows by $N^2$. In addition to complexity in monolithic IC implementation, the package pin constraints will limit the number of input and output lines (N).

Multi-stage Interconnection Networks (MIN) enable building large switches from smaller switches in a structured manner. A three stage (stages 120, 130 and 140) network is shown in FIG. 2. The network of FIG. 2 is a class of networks based on the Clos network. This type of network belongs to so-called constant stage networks or limited stage networks. In FIG. 2, a Clos network 100 is shown with N input lines 110 and N output lines 150. The N input lines 110 are divided into m groups 111, 112, . . . , 119, in FIG. 2 we are showing 'n' rather than 'm', each group consisting of n inputs (N=m*n). Each group of n inputs is connected to a (n×k) switch 121, 122, . . . 129. The first stage 120 (also called input stage) consists of m groups of (n×k) switches 121, 122, . . . , 129, each having n input lines (not shown) and k output lines (not shown). The second stage 130 (also called middle stage) consists of k switches 131, 132, . . . , 139 of size (m×m). The third stage 140 (also called the output stage) consists of m(k×n) switches 141, . . . , 149. The N output lines 150 include the outputs 151, 152, . . . , 159 of the m switches 141, 142, . . . , 149, respectively, in the output stage 140.

With reference to FIG. 2, the outputs 161, 162, . . . , 169 of the first stage 120 each consist of k lines which will be denoted by $O1_{ij}$ ($1 \leq i \leq m$, $1 \leq j \leq k$), the i index identifies the switch in the $1^{st}$ stage and the index j identifies one of the k output lines of the $1^{st}$ stage of the switch. The input lines 171, 172, . . . 179 of the second stage 130 each consist of m lines denoted by $I2_{ij}$ ($1 \leq i \leq k$, $1 \leq j \leq m$) the index i identifies one of the k switches and the index j identifies one of the m input lines of the switch. The output lines 181, 182, . . . 189 of the second stage 130 each consist of m lines denoted by $O2_{ij}$ ($1 \leq i \leq k$, $1 \leq j \leq m$) the index i identifies one of the k switches and the index j identifies one of the m output lines. The input lines 191, 192, . . . 199 of the third stage 140 each consist of k lines denoted by $I3_{ij}$ ($1 \leq i \leq m$, $1 \leq j \leq k$) the index i identifies one of the m switches and the index j identifies one of the k input lines of the switch. The output lines 151, 152, . . . 159 of the third stage 140 each consist of n lines denoted by $O3_{ij}$ ($1 \leq i \leq m$, $1 \leq j \leq n$) the index i identifies one of the m switches and the index j identifies one of the n outputs of the switch. The interconnection between stages is as follows:

Output j of switch i in the first stage (O1ij) is connected to input i of switch j in the second stage (I2ji).

Output j of switch i in the second stage (O2ij) is connected to input i of switch j in the third stage (I3ji).

The Clos network 100 of FIG. 2 is denoted as a v(k, n, m). To avoid blocking problems, the design parameters of the network must be selected properly. Clos has shown that the three stage network of FIG. 2 is strictly non-blocking if $k \geq (2n-1)$. The complexity of switch can be reduced if existing connections can be broken and remade without loss of data in order to establish additional new connections. This type of switch is called a Rearrangeably Nonblocking Switch. The three stage network of FIG. 2 is rearrangeably nonblocking if $k \geq n$.

The input stage 120 and output stages 140 of a Clos network consist of m switches. The middle stage 130 of network 100 consists of k switches. The prior art suggest systems with integrated input and output stages and separate middle stage. The problem with prior art is that the structure is not modular, that is the v(k, n, m) network of FIG. 2 can not be constructed from m identical modules.

Therefore, there is a need for constructing a Clos network v(k, n, m) from m identical modules, furthermore there is a need for constructing a modular and scalable Clos networks v(k, n, m), wherein network of different sizes (different values of m) can be constructed from m identical modules and allows building larger networks from a module by adding such modules as needed. The advantage of a modular structure is that it allows integration into a single module or monolithic Integrated Circuit (IC). The advantages of modular and scalable structure is that it allows building networks of different sizes from the same module or IC.

SUMMARY OF THE INVENTION

Briefly, an embodiment of the present invention includes an expandable network comprising of modules having switches wherein the modules are identical. Furthermore, a method for building a network with varying sizes (different values of m) from a common module is disclosed.

These and other features and advantages of the present invention will become well understood upon examining the figures and reading the following detailed description of the invention.

IN THE DRAWINGS

DETAILED DESCRIPTION OF THE PREFERRED EMBODIMENTS

Figure 3:
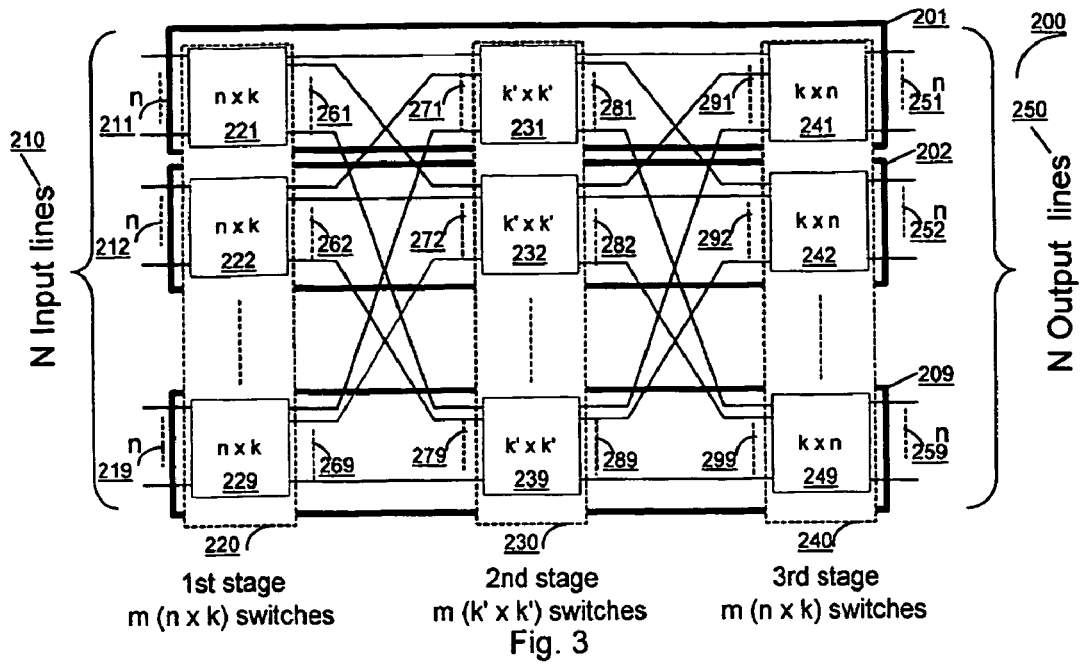
FIG. 3 illustrates a Clos network in accordance with an embodiment of the present invention.

Referring now to FIG. 3, a Clos network v(k, n, m) 200 is shown in accordance with an embodiment of the present invention. The network 200 includes N input lines 210 and N output lines 250. The N input lines 210 are divided into m groups 211, 212, . . . , 219, each group consisting of n input lines (N=m*n). Each group of n input lines is connected to a (n×k) switch 221, 222, . . . 229. The first stage 220 (also called input stage) consists of m groups of (n×k) switches 221, 222, . . . , 229, each having n inputs 211, 212, . . . , 219 and k outputs 261, 262, . . . , 269. The second stage 230 (also called middle stage) consists of m switches 231, 232, . . . , 239 of size (k'×k') each having k' inputs 271, 272, . . . , 279 and k' outputs 281, 282, . . . , 289. The third stage 240 (also called the output stage) consists of m(k×n) switches 241, . . . , 249 each having k inputs 291, 292, . . . , 299 and n outputs 251, 252, . . . , 259. The N output lines 250 consist of the outputs 251, 252, . . . , 259 of the m switches 241, 242, . . . , 249 in the output stage 240.

The input stage 220, the middle stage 230, and output stages 240 of Clos network 200 of the present invention all consist of m switches. The switches 221, 231, and 241 are grouped together and are included in the module 201. In a similar manner, the other modules 202, . . . , 209 include the grouping of switches (222, 232, 242), . . . , (229, 239, 249), respectively. The network 200 is built from identical modules 201, 202, . . . , 209 where each module includes groups of switches (221, 231, 241), (222, 231, 242), . . . , (229, 239, 249). Each module includes three switches an input switch of size (n×k), a middle switch of size (k'×k') and an output switch of size (k×n)

Figure 1:
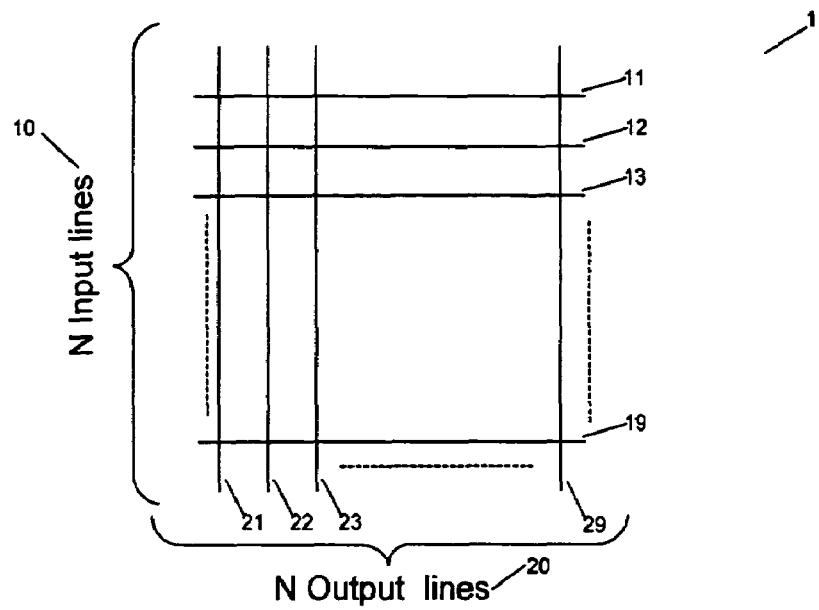
FIG. 1 shows a switch based on crossbar matrix
Figure 2:
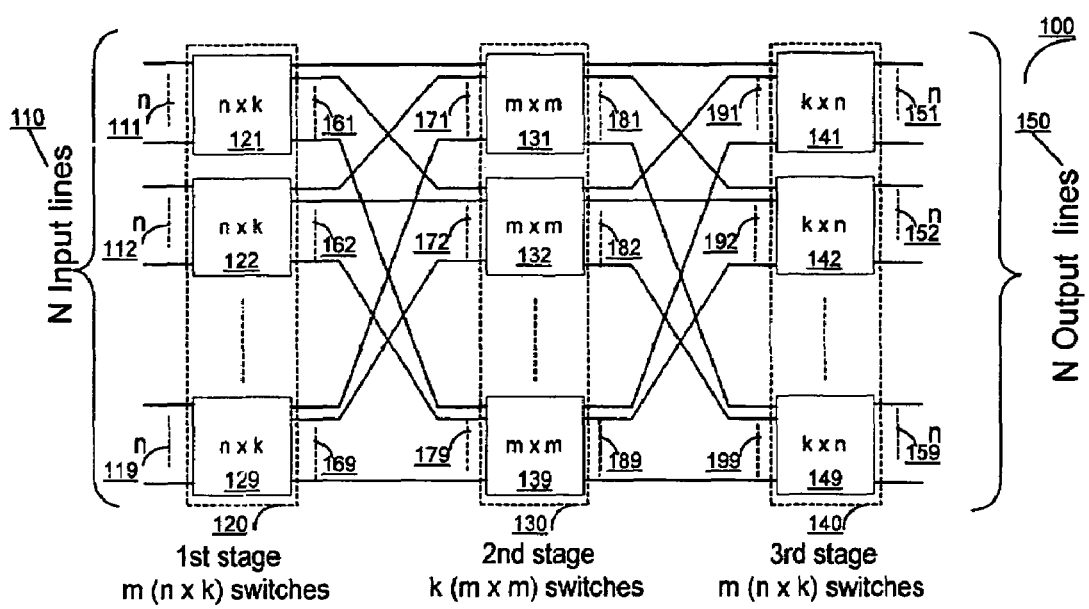
FIG. 2 shows an example of Clos network of prior art.

A discussion is now presented regarding the selection of the parameter k'. With reference to FIG. 2, the second stage 130 of network 100 consists of k (m×m) switches. The second stage 230 of network 200 consists of m(k'×k') switches 231, 232, . . . , 239.

With each (k'×k') switch, a network of q (m×m) switches, can be built wherein q is the quotient of dividing k' by m(q=Q(k'/m) where Q (x/y) denotes the quotient of x divided by y). The m*q inputs and outputs of (k'×k') switch are used and the (k'−m*q) remaining inputs and outputs are unused. The minimum number of equivalent (m×m) switches that is required in the second stage is k. Since in the second stage of network 200, there are m(k'×k') switches, a network of m*q (m×m) switches can be built, therefore parameter k' must be selected such that:

$$m*Q(k'/m) \geq k \qquad \text{Eq. 1}$$

The connectivity of the middle stage 230 of the network 200 is now described. A simple way of describing the connectivity of the middle stage 230 is in terms of an equivalent virtual (m×m) switch. That is, the middle stage 230 is first transformed, into an equivalent virtual k(m×m) switches and the connectivity of the equivalent virtual k(m×m) switches is the same as that described previously. There are m(k'×k') switches 231, 232, . . . , 239 and as described above, with each (k'×k') switch, a network of q(m×m) switches is built. Starting with the first switch 231, the q*m input and output lines are assigned to the q equivalent (m×m) switches and any remaining input and output lines of the switch are unused. The virtual (m×m) switches are labeled 1, . . . , q, the assigned input lines are labeled $I2_{ij}$. The index i identifies one of the virtual switches and the index j identifies one of the m input lines of the virtual switch, the assigned output lines are labeled $O2_{ij}$. The index i identifies one of the virtual switches and the index j identifies one of the m outputs. The same process is repeated for the second switch 232, the virtual (m×m) switches are labeled (q+1), . . . , 2q, the assigned inputs and outputs are labeled $I2_{ij}$ and $O2_{ij}$ respectively similar to the first switch. This process is repeated until the last switch 239. With k' satisfying Eq. 1, then at least k equivalent (m×m) virtual switches is constructed. The inputs lines of said virtual switches are labeled $I2_{ij}$ ($1 \leq i \leq k$, $1 \leq j \leq m$) where the index i identifies one of the k virtual (m×m) switches and the index j identifies one of the m input lines of the switch. The output lines of the virtual switches are labeled $O2_{ij}$ ($1 \leq i \leq k$, $1 \leq j \leq m$). The index i identifies one of the k (m×m) virtual switches and the index j identifies one of the m outputs. The interconnection between stages is as follows:

Output j of switch i in the first stage (O1ij) is connected to input i of virtual switch j in the second stage (I2ji).

Output j of virtual switch i in the second stage (O2ij) is connected to input i of switch j in the third stage (I3ji).

We have disclosed a v(k, n, m) switching network using m identical modules and a method of building a v(k, n, m) switching network from m identical modules.

Next, methods for building a scalable v(k, n, m) switching network from a common module will be disclosed. The method includes constructing a switching network 200 from common module 201 and selecting parameter k, k' and specifying a subset of integers $\mathscr{M}$ such that networks with values of m belonging to $\mathscr{M}(m \epsilon \mathscr{M})$ can be constructed with the same common module.

Let the set of divisors of k be denoted by $\mathscr{M}_k = \{m | m \text{ divides } k\}$. If k' is selected to be equal to k(k'=k), it is obvious that m*Q(k'/m)=k for all $m \epsilon \mathscr{M}_k$, and Eq. 1 is satisfied. Please note that the set $\mathscr{M}$ at least includes 1, and k. Therefore one method is as follows:

$$k'=k \text{ and } \mathscr{M} = \mathscr{M}_k = \{m | m \text{ divides } k\} \qquad (A1)$$

Let $m_1, m_2, \ldots$ denote divisors of k other than 1, and k. If k is prime then the set $\{m_i\}$ is empty. With k' and $\mathscr{M}$ according to A1 then Eq. 1 is satisfied for all ($m \epsilon \mathscr{M}_k$), and network of size $\{n, (m_1)*n, (m_2)*n, \ldots, (k)*n\}$ can be constructed from identical modules 201 as described previously.

Another method is as follows:

$$k'=k=a^s, \text{ and } \mathscr{M} = \{m | m = a^r (1 \leq r \leq s)\} \qquad (A2)$$

With k' and $\mathscr{M}$ according to A2 then Eq. 1 is satisfied for all ($m \epsilon \mathscr{M}$), and network of size $\{n, (a^1)*n, (a^2)*n, \ldots, (a^s)*n\}$ can be constructed from identical modules 201 as described previously. In practice, integer a is typically two (2) and $k=2^s$, and $m=2^r$ ($1 \leq r \leq s$). For example, select $k'=k=32=2^5$. Then networks of size n, $(2^1)*n$, $(2^2)*n$, $(2^3)*n$, $(2^4)*n$ and $(2^5)*n$ can be constructed from identical modules 201 as described in the embodiment of present invention.

The above method is an exponentially scalable solution. The exponentially scalable method is perfectly acceptable method in certain applications. We now present a linearly scalable method.

Another method to satisfy Eq. 1 is as follows:

$$k'=k+(M-1), \mathscr{M} = \{m | 1 \leq m \leq M\}, \qquad (A3)$$

With k' and $\mathscr{M}$ according to A2 then Eq. 1 is satisfied for all ($m \epsilon \mathscr{M}$). To demonstrate this let k=q*m+r ($0 \leq r \leq m-1$), and let k'=k+(M−1), $$q*m \leq k < (q+1)*m$$

If k is divisible by m then r=0, and m*Q(k'/m)=k and Eq. 1 is satisfied.

If k is not divisible by m then $1 \leq r \leq (m-1)$, and $(k+(m-1)) \geq (q+1)*m$, Since $m \leq M$ therefore $k'=k+(M-1) \geq (q+1)*m$, and $Q(k'/m) \geq (q+1)$, therefore $m*Q(k'/m) \geq (q+1)*m \geq k$ and Eq. 1 is satisfied.

With k' according to A3 then you can build a network of size n, 2n, 3n, 4n . . . , M*n, that is you can build a linearly scalable Clos network up to M*n from identical modules 201 as described in the embodiment of present invention.

Several methods for constructing a scalable modular Clos network has been disclosed. Although the method has been described in terms of specific values for {k, k', ✗}, different values of {k, k', ✗} that satisfy Eq. 1 are considered to fall within the true spirit and scope of the invention.

Figure 4:
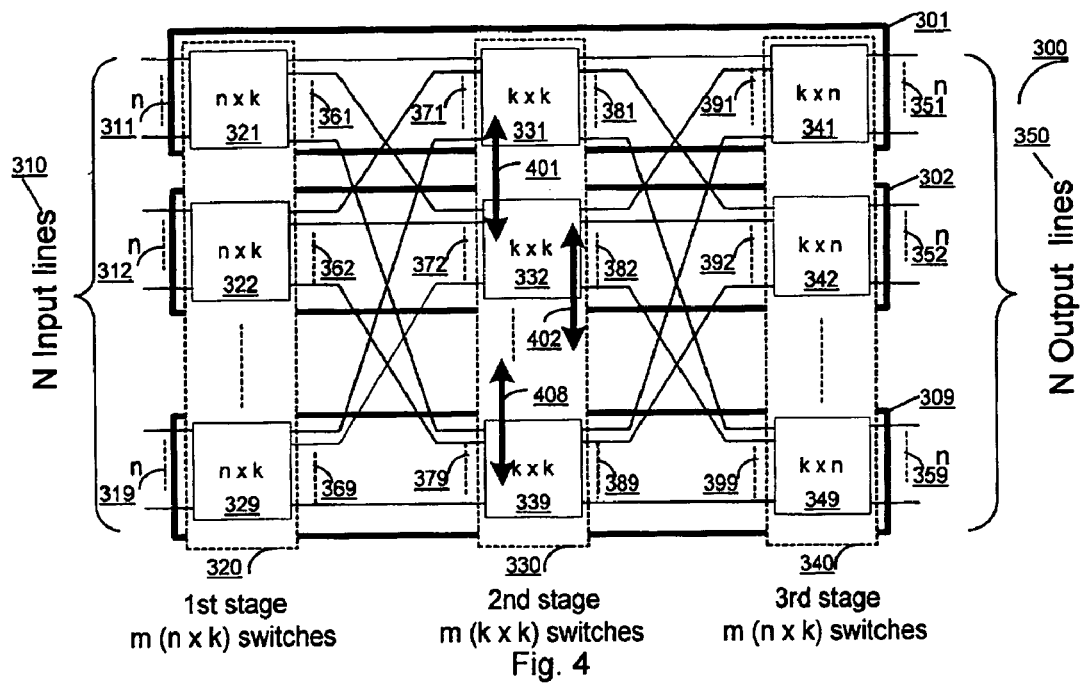
FIG. 4 illustrates a Clos network in accordance with an embodiment of the present invention.

In the method described, some inputs and outputs, specifically (k'−m*q) where q=Q(k'/m), of the $2^{nd}$ stage of module 201 will be unused since there is not enough inputs and outputs to make an m×m switch. In another embodiment, the parameter k' is selected to be equal to k. After assigning the m*q inputs and outputs, the remaining (k−m*q) inputs of the switch and the first ((m+1)*q−k) inputs and outputs of the next switch are assigned to next virtual (m×m) switch, the remaining inputs and output of the next switch are grouped into groups of m inputs and outputs, forming complete virtual (m×m) switches. With remaining inputs and outputs, the same process is repeated. Since there is no unused inputs of outputs, k'=k, however in this system, some of the virtual (m×m) switches are split between two modules. In order to implement the split virtual (m×m) switches in the middle switch, additional inputs and outputs between adjacent modules is included. Specifically, there is m bi-directional (or 2m unidirectional) signals between adjacent modules to allow operation of split switches. FIG. 4 shows an embodiment 300 according to the above. The common module 302 includes a $1^{st}$ (n×k) switch, a $2^{nd}$ (k, k) switch, a $3^{rd}$ (k×n) switch, and a first M bi-directional lines 401 and a $2^{nd}$ M bi-directional lines 402 between adjacent modules for implementing split switches. It should be noted that for the first and last modules, one of the M-bidirectional lines will be unused. A Clos networks v(k, n, m) of size n, 2n, 3n, 4n, . . . , M*n, can be constructed from module 302 as described above. Although the above embodiment has been described in terms of a specific method to implement split switches between adjacent modules other methods of implementing split switches between adjacent modules fall within the true spirit and scope of the invention.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

What I claim is:

1. A switching network including rows and columns of switches comprising:
   a) a first stage of switches defining a first column of said switching network having input lines and output lines and comprising m(n×k) input switches, wherein m is an integer number, n is an integer number representing the number of input lines and k is an integer number representing the number of output lines;
   b) a second stage of switches defining a second column of said switching network comprising of m(k'×k') middle switches, k' is an integer number representing the number of inputs and outputs; and
   c) a third stage of switches defining a third column of said switching network comprising of m(k×n) switches; and
   d) a plurality of modules, each module defining a row of the switching network and including one input switch of the first stage of switches, one middle switch of the second stage of switches, one output switch of the third stage of switches,
   wherein the modules of the plurality of modules are identical and k' is selected such that m*Q(k'/m)>k (where Q(x/y) denotes the quotient of dividing x by y) to allow using m switches in the second stage.

\* \* \* \* \*